United States Patent [19]
Larson et al.

[11] Patent Number: 5,936,635
[45] Date of Patent: Aug. 10, 1999

[54] SYSTEM AND METHOD OF RENDERING POLYGONS INTO A PIXEL GRID

[75] Inventors: Michael Kerry Larson, Austin; Daniel P. Wilde, Cedar Park, both of Tex.

[73] Assignee: Cirrus Logic, Inc., Fremont, Calif.

[21] Appl. No.: 08/671,977

[22] Filed: Jun. 28, 1996

[51] Int. Cl.$^6$ .................................................. G06T 11/00
[52] U.S. Cl. ................................................... 345/441
[58] Field of Search ................... 395/133, 141; 345/433, 441

[56] References Cited

U.S. PATENT DOCUMENTS

| | | | |
|---|---|---|---|
| 4,583,185 | 4/1986 | Heartz | 345/421 |
| 4,586,038 | 4/1986 | Sims et al. | 345/430 |
| 4,692,880 | 9/1987 | Merz et al. | 345/430 |
| 4,714,428 | 12/1987 | Bunker et al. | 434/43 |
| 4,715,005 | 12/1987 | Heartz | 345/421 |
| 4,727,365 | 2/1988 | Bunker et al. | 345/139 |
| 4,811,245 | 3/1989 | Bunker et al. | 345/429 |
| 4,821,212 | 4/1989 | Heartz | 345/426 |
| 4,825,391 | 4/1989 | Merz | 345/431 |
| 4,855,937 | 8/1989 | Heartz | 345/421 |
| 4,862,388 | 8/1989 | Bunker | 345/427 |
| 4,868,771 | 9/1989 | Lee et al. | 364/578 |
| 4,905,164 | 2/1990 | Chandler et al. | 345/431 |
| 4,958,305 | 9/1990 | Piazza | 345/427 |
| 4,965,745 | 10/1990 | Economy et al. | 345/431 |
| 4,974,176 | 11/1990 | Buchner et al. | 345/428 |
| 5,126,726 | 6/1992 | Howard et al. | 345/138 |
| 5,187,754 | 2/1993 | Currin et al. | 382/284 |
| 5,191,642 | 3/1993 | Quick et al. | 345/427 |
| 5,214,753 | 5/1993 | Lee et al. | 395/125 |
| 5,268,996 | 12/1993 | Steiner et al. | 345/426 |
| 5,293,467 | 3/1994 | Buchner et al. | 345/422 |
| 5,357,579 | 10/1994 | Buchner et al. | 382/100 |
| 5,367,615 | 11/1994 | Economy et al. | 345/542 |
| 5,420,970 | 5/1995 | Steiner et al. | 345/433 |
| 5,625,768 | 4/1997 | Dye | 345/441 |

FOREIGN PATENT DOCUMENTS 9636011  11/1996  WIPO .

*Primary Examiner*—Almis R. Jankus
*Attorney, Agent, or Firm*—Conley. Rose & Tayon; Steven A. Shaw

[57] ABSTRACT

A graphics system includes a graphics controller for rendering polygons with a minimum number of steps and registers. The graphics controller includes a register file for receiving initial parameters for the polygon from a host. The graphics controller also includes a polygon engine for loading parameters from the register file and using these parameters to generate a starting X value for each scan line and a width value for each scan line to permit efficient rendering of the polygon without "edge walking" the polygon. The polygon engine includes a counter and a pair of accumulators for defining the number of orthogonal scan lines, the X start value for each scan line, and the width of each scan.

23 Claims, 6 Drawing Sheets

SYSTEM AND METHOD OF RENDERING POLYGONS INTO A PIXEL GRID

CROSS-REFERENCES TO RELATED APPLICATION

This application relates generally to commonly-assigned U.S. Pat. No. 5,625,768, entitled "Method and Apparatus for Correcting Errors in Pixel Characteristics When Interpolating Polygons into a Pixel Grid.

FIELD OF THE INVENTION

The present invention relates generally to a graphics system for a personal computer. More particularly, the present invention relates to a method and apparatus for rendering polygons into a pixel grid. Still more particularly, the present invention relates to an improved method of efficiently and quickly interpolating polygons in a pixel grid, requiring a minimal number of initial calculations and using a minimum amount of register space in order to efficiently render the polygon.

DESCRIPTION OF THE RELATED ART

Sophisticated graphics packages have been used for some time in expensive computer aided drafting, design and simulation systems. Increased capabilities of graphic controllers and display systems, combined with standardized graphics languages, have made complex graphics functions available in even the most routine applications. For example, word processors, spread sheets and desktop publishing packages now include relatively sophisticated graphics capabilities. Three-dimensional (3D) displays have become common in games, animation, and multimedia communication and drawing packages.

The availability of sophisticated graphics in PC's has driven a demand for even greater graphic capabilities. To obtain these capabilities, graphic systems must be capable of performing more sophisticated functions in less time to process greater amounts of graphical data required by modern software applications. In particular, there is a continuing need for improvements in software algorithms and hardware implementations to draw three-dimensional objects using full color, shading, texture mapping, and transparency blending.

The development of raster display systems has dramatically reduced the overall cost and increased the capabilities of graphic systems. In a raster display system, a set of orthogonal or horizontal scan lines, each comprising a row of pixels, forms an array or grid of pixels to represent the entire screen area. The screen preferably comprises a cathode ray tube (CRT), LCD display, or the like, capable of scanning the entire pixel grid at a relatively high rate to reduce flicker. The pixel data preferably is stored in a frame buffer comprising dynamic random access memories (DRAM's), or more preferably video RAMs VRAM's), where each pixel is represented by one or more bits depending upon the desired resolution. Typical display systems are capable of drawing screens with multiple colors at a variety of screen resolutions, including resolutions of 640 pixels× 480 pixels, 800×600, 1024×768, 1280×1024, or even higher pixel value combinations, depending upon the software drivers and the hardware used.

Typically, a video controller scans and converts the pixel data in the frame buffer to provide control signals for the screen system. In particular, the video controller scans each of the pixel values sequentially, typically from top to bottom and from left to right, and converts pixel data into intensity values for corresponding pixels on the screen. In a color graphics system using a CRT, three separate beams are controlled for each of the primary colors, where the intensity of each of the beams is determined by the pixel value corresponding to the respective colors. A similar system is used for LCD displays. In the preferred embodiment, each pixel value comprises 24 bits (or three bytes), with one byte dedicated for identifying the intensity of each of the primary colors (red, green and blue).

Other improvements have been made in the hardware realm. Graphics processors and accelerators are available with software drivers that interface the host central processing unit (CPU) to the graphics processor. In general, the software driver receives information for drawing objects on the screen, calculates certain basic parameters associated with the objects and provides these to the graphics processor. The software driver then sends a command for the graphics processor to draw the object into the frame buffer. A graphics processor may use interpolation techniques where the fundamental information for the object to be drawn comprises a series of initial and incremental parameters or values. The graphics processor loads or otherwise receives the initial parameters for a first pixel, and then interpolates the object by incrementing the parameters until the object is complete. The parameters include x, y coordinate values to identify or locate each pixel on the screen.

Despite the high resolutions and speed of raster graphics, several inherent problems still exist when drawing polygons. For example, randomly-oriented triangles typically are "tessellated" by splitting the triangle into two orthogonally-oriented, smaller triangles and separately interpolating the two smaller triangles. Orthogonally-oriented triangles are merely a subset of randomly-oriented triangles except restricted to include a "flat" or purely horizontal (orthogonal) base or top side aligning with the orthogonal scan lines of pixels. A software driver determines a horizontal dividing line forming the two separate triangles, and then calculates interpolation parameters and provides these parameters to interpolator logic. As a result of this procedure, the software driver sends two separate commands to the interpolation logic, which correspondingly interpolates two separate triangles. Interpolating two separate triangles in this manner, however, is costly in terms of overhead and speed because additional logic and extra time is required. Two separate passes through the interpolators slow down the process because the interpolators must be reloaded for the second triangle. In addition, two separate interpolators are used to walk the edges of each triangle, one for a first side and one for an opposite side, which results in a starting point and an endpoint for each orthogonal scan line. The starting point is loaded into a counter and a comparator compares the endpoint value with the contents of the counter for each pixel in the current scan line. The comparator increases system cost and slows down the entire interpolation process.

Referring now to the triangle 40 shown in FIG. 2, a software driver receives vertex information (including the x, y coordinates of each vertex 41, 42, 43) and identifies a main slope 45 extending the vertical length of the polygon. The other two sides of triangle 40 are referred to as opposite slopes. The polygon is interpolated using orthogonal (ORTHO) scan lines of pixels that extend from the main slope to the opposite slopes. The vertical or y parameter is used as a reference coordinate, so that the y pixel value is preferably incremented or decremented by one for each scan line. A value for the main slope is calculated as an initial condition and is used as the orthogonal component (or x coordinate) of the main slope. The main slope value represents the change in the orthogonal or x parameter with each unity increment of the y parameter. Thus, the main slope value defines the x coordinate starting point for each scan line.

The software driver also determines initial and incremental width values and interpolates the width rather than edge walking the opposite slopes. The interpolated width value is loaded into a counter and decremented for each pixel in the current scan line. When the width counter becomes zero or otherwise reaches terminal count, the counter asserts a terminal count signal indicating that the line is complete. As a result, extra logic such as a comparator is not required to determine when the current line is completed.

As shown in FIG. 2, a triangle is generally divided into two halves 47, 49. For purposes of simplicity, the following discussion assumes the triangle 40 is drawn from top to bottom. As part of the initial conditions calculated by the software driver, a first initial width (WIDTH MAIN) for the graphics starting point in the first half 47 of triangle 40 is determined together with a first half width slope ($\Delta$ WIDTH MAIN). The initial width value (WMAIN) defines the number of pixels drawn on the first scan line, while the first half width slope value ($\Delta$WMAIN) defines the incremental variances for the width of each successive scan line in the first half 47 of the triangle 40. Both of these values are loaded into the interpolator for performing shading of the first half 47 of triangle 40.

In the main slope method, after the first half 47 of the triangle 40 is shaded, a second initial width value (WIDTH OPP) corresponding to the greatest width of triangle 40 (shown by line 48) is loaded into the interpolator together with a second half width slope value ($\Delta$ WIDTH OPP). The second half 49 of triangle 40 then is shaded using the second initial width value (WIDTH OPP) to define the number of pixels to illuminate on the first scan in the second half 49. The width of each successive scan line is determined from the second half width slope value ($\Delta$ WIDTH OPP). Separate register locations are provided to store the initial width values (WIDTH MAIN and WIDTH OPP) and width slope values ($\Delta$ WIDTH MAIN and $\Delta$ WIDTH OPP) for the first half 47 and second half 49 of the triangle 40. Multiplexer logic is provided to switch to the separate registers to access the second half parameters after the first half of the polygon is completed.

Despite the advantages offered by the main slope interpolation technique, this technique required that a number of initial conditions be calculated and loaded in registers for interpolating a scan line. The present invention comprises an improvement on the technique by reducing the number of initial conditions to be calculated, thus reducing the number of registers required for the graphics system.

SUMMARY OF THE INVENTION

The interpolation method of the present invention permits randomly-oriented triangles (and certain other polygons) to be interpolated in an expedient manner with a minimum number of steps and registers. A graphics processor or controller receives information from a host processor identifying the type of graphics to be rendered. If a polygon is to be drawn, the graphics processor receives vertex points, a main slope value of the polygon and a width slope value for two sections of the triangle. The data received from the host is stored in a register file. The polygon is interpolated using orthogonal scan lines of pixels extending from the main slope of the triangle to the opposite slopes. The y coordinate value of the pixel is used as a reference coordinate. Thus, the y coordinate value preferably is incremented or decremented by one to generate each successive scan line.

The graphics controller includes a polygon engine for determining the orthogonal component (or x coordinate) starting point for each successive scan line. This x coordinate starting point is determined from the main slope value and the initial x point ($X_1$) The polygon engine also determines incremental width values and interpolates the width rather than edge walking the opposite slopes. The interpolated width value is determined from the width slope value by a width accumulator. A y counter also is provided to identify the section of the triangle to be rendered. The y counter performs a count for each section of the triangle, which indicates the number of scan lines for each triangle. A polygon state machine monitors the y count to determine when the count equals zero. In response, the polygon state machine provides a signal to a pair of multiplexers to switch the width slope and count values for the width accumulator and y counter.

The present invention assumes that the initial width for the first half of the triangle is a constant value (such as zero), thus also eliminating the need to load in the initial width parameter for the first half of the triangle, except in certain limited circumstances. In addition, the present invention maintains a continuous width count in the width accumulator, eliminating the need to load an initial width for the second (or bottom) half of the polygon (the WIDTH OPP). Instead, the last width count for the first half of the polygon is used as the initial width value for the second half of the polygon. The elimination of the opposite width values also eliminates the need for dedicated register space to store these parameters.

In accordance with the present invention, a polygon can be drawn into a pixel grid with a minimal number of initial calculations. These calculations include: (1) the initial x, y coordinates of the starting vertex point (which preferably is the top vertex, $X_1$, $Y_1$); (2) the main slope value ($\Delta$ MAIN, which defines the x coordinate starting point for each scan line; (3) a top half count value (COUNT ø the vertical length of the top half of the triangle); (4) a top width slope (WIDTH MAIN, the difference in width for each successive scan in the top half of the triangle); (5) a bottom half count (COUNT 1, the vertical length of the bottom half of the triangle); and (6) a bottom width slope (WIDTH OPP, the difference in width for each successive scan in the bottom half of the triangle).

The interpolation method according to the present invention simplifies the logic and provides faster interpolation.

BRIEF DESCRIPTION OF THE DRAWINGS

A better understanding of the present invention can be obtained when the following detailed description of the preferred embodiment is considered in conjunction with the following drawings, in which:

FIG. 7 is a table depicting an exemplary construction of the register file of FIG. 4.

DETAILED DESCRIPTION OF THE PREFERRED EMBODIMENT

The present invention is an improvement of the interpolating technique disclosed in commonly-assigned U.S. Pat. No. 5,625,768, the teachings of which are incorporated herein. The following discussion is drafted to focus on the improvements of the present invention, and thus omits certain details of the interpolation system not directly related to the present invention. For a more detailed description of the interpolation system, reference may be made to U.S. Pat. No. 5,625,768.

Figure 1:
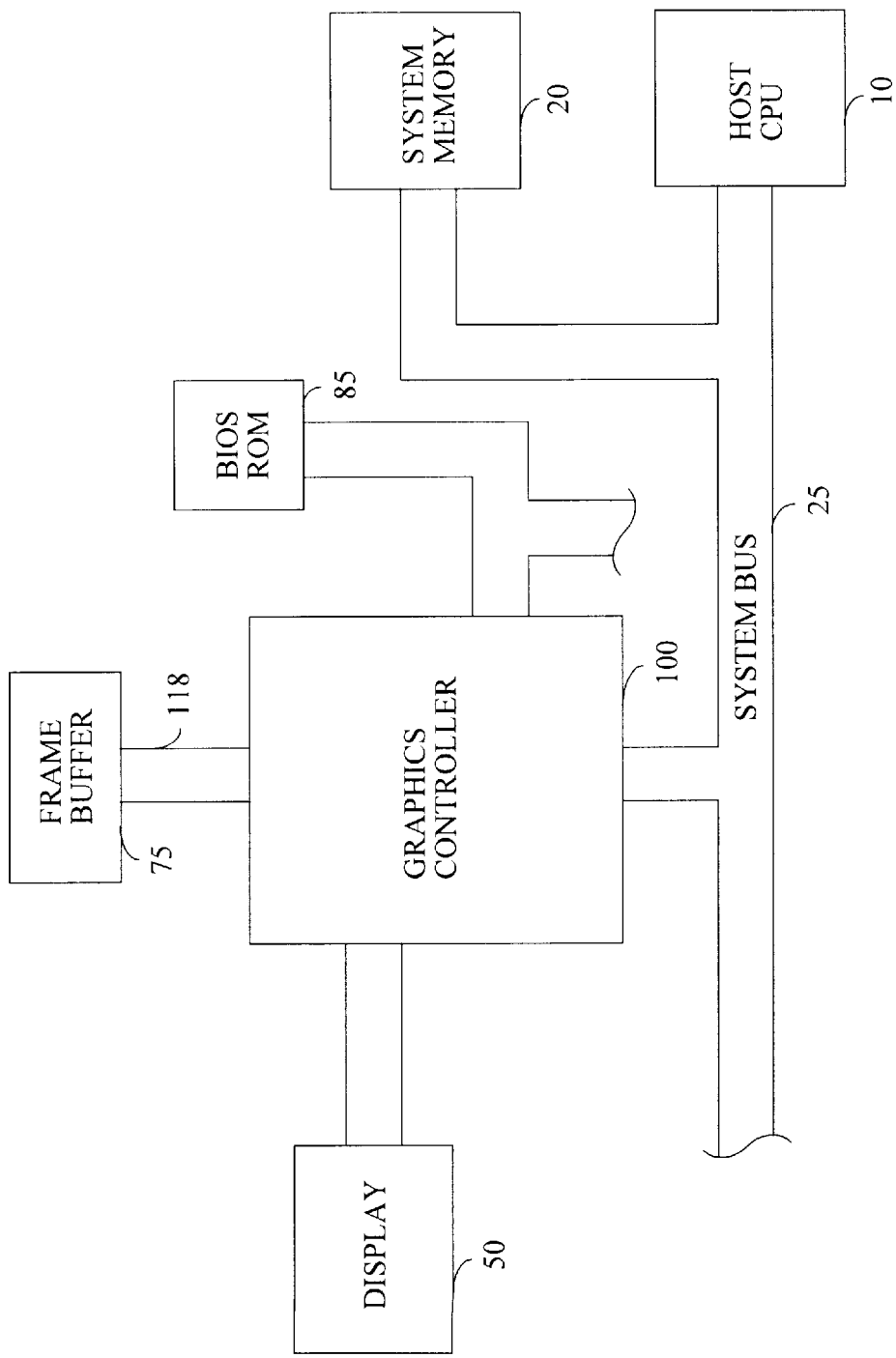
FIG. 1 is a simplified block diagram of a graphics controller connected to a system bus of a computer system, in accordance with the principles of the present invention.

Referring now to FIG. 1, a simplified block diagram is shown of a graphics system coupled to a system bus 25 of a host computer system, where the graphics system includes a graphics processor or controller 100 implemented according to the present invention. The system bus 25 may comprise any one of a plurality of different types of host or input/output (I/O) buses, including the industry standard architecture (ISA), the extended ISA (EISA), the peripheral component interconnect (PCI), the video electronic standard association (VESA) local bus or any other standardized system bus of a computer system. The graphics processor 100 preferably comprises a 32-bit graphics processor with a clock speed of at least 33 MegaHertz (MHz). The graphics processor 100 preferably couples directly to the system bus 25. System bus also couples to a host CPU 10 and system memory 20.

As shown in FIG. 1, graphics controller 100 also connects to a display unit 50, a frame buffer 75 and BIOS ROM 85. In the preferred embodiment, the frame buffer 75 forms part of a raster display implemented in a bank of RDRAM buffers, where the digital data comprises a rectangular array of picture elements referred to as pixels or pixel values. Each pixel can be defined by an 8 bit value, which specifies the intensity of a single color of a corresponding pixel on a screen of the display unit 50. For full color display, either three passes are made or three parallel logic slices are implemented for the three primary colors to achieve 24 bit pixel values. The display unit 50 may be any suitable type of display device, such as a cathode ray tube (CRT) for desktop, workstation or server applications, or a liquid crystal display (LCD), as commonly used for portable computers.

The RDRAM frame buffer 75 provides a performance improvement by permitting faster access to pixel data, compared to accessing data stored in the main memory 20 of the host computer system. The graphics processor 100 communicates to the frame buffer 75 through address data and control lines, collectively referred to as the RBUS 118.

The host computer system generally includes a central processing unit (CPU) 10 that executes various software programs. One of the software programs executed by the CPU 10 comprises a software driver, which calculates and loads main and orthogonal slopes, start and stop values for pixel position, intensity, depth and transparency of objects to be rendered by the graphics processor 100. The software driver preferably is loaded into the system memory 20 from a permanent magnetic storage device, such as a hard drive or floppy drive device. Once loaded, the software driver is executed by the CPU 10. The BIOS ROM 85 operates in accordance with conventional techniques to support the possible bus environments, and to permit implementation of standard video modes. Preferably, the BIOS RAM 85 is read once during system initialization.

It should be understood that the particular embodiment shown in FIG. 1 is only one of many possible implementations of a graphics system for use in a personal computer system. FIG. 1 is simplified for purposes of clarity so that many control signals are omitted. In the preferred embodiment, the graphics processor 100 provides hardware support for 2D and 3D graphics, and for text and windowing operations of a computer system. The graphics processor 100 transfers digital data between the main memory 20, the frame buffer 75, and processes data for storage in the frame buffer 75 for ultimate display on the display device 50.

Figure 3:
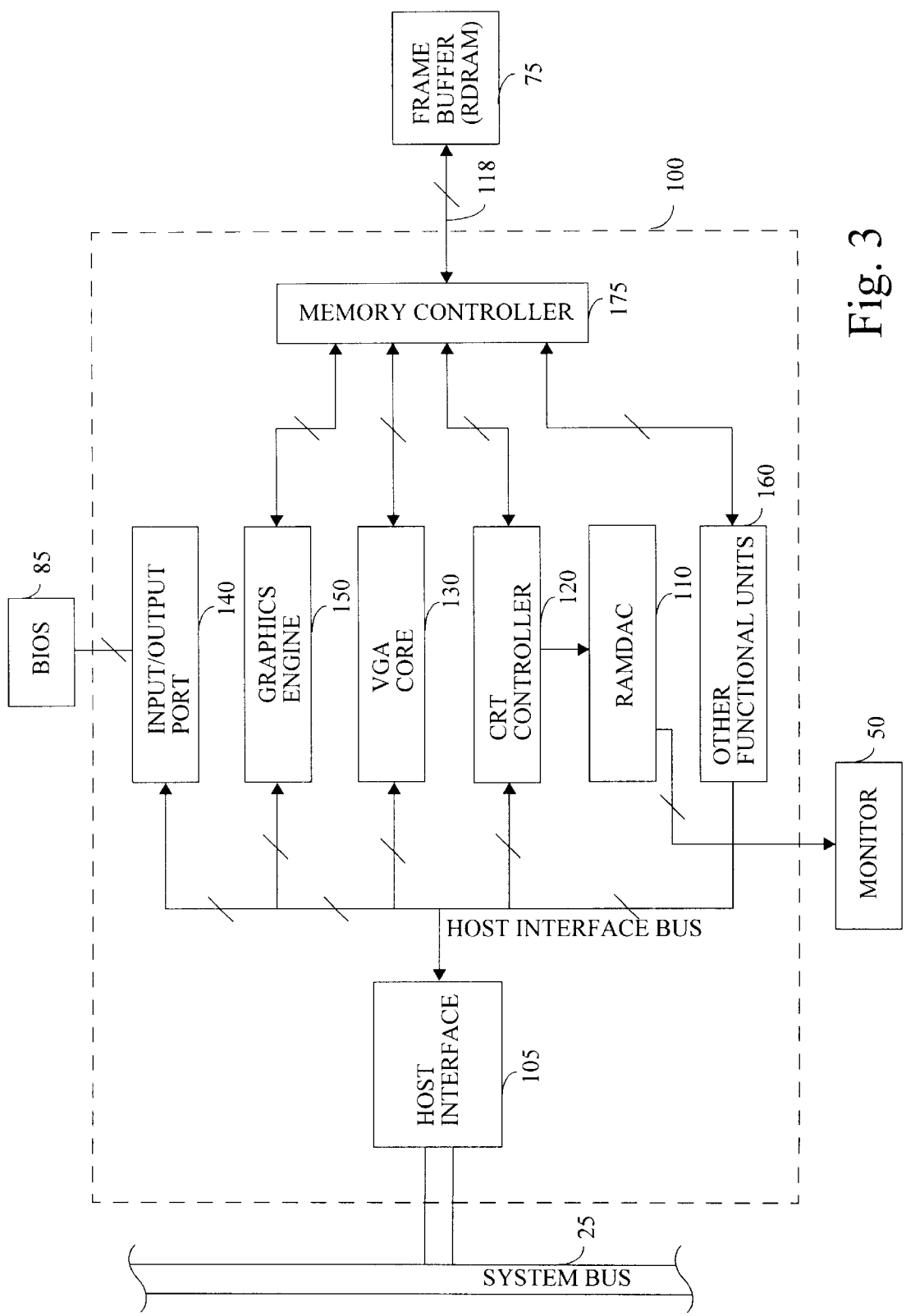
FIG. 3 is a block diagram of the graphics controller of FIG. 1.

Referring now to FIG. 3, a simplified block diagram of the graphics processor 100 is shown. The graphics processor 100 preferably includes all the necessary hardware to support a flexible multimedia display system. Thus, processor 100 preferably includes an integrated random access memory digital-to-analog converter (RAMDAC) 110, a CRT controller 120, VGA core 130, an I/O port 140, graphics engine 150, and various other functional units 160. The other functional units may include clock generators, a V-Port module, a programmable figuring synthesizer and configuration registers.

The processor 100 preferably includes a host interface 105 that connects directly to the system bus 25. The host interface 105 preferably is capable of functioning as a bus master device and is PCI compliant to support zero wait state burst mode. The host interface 105 preferably includes an address decoder for determining if the graphics controller 100 is the target of a transaction on the system bus 25. The host interface 105 couples to a host interface bus 125, and preferably arbitrates control of the interface bus 125. The host interface bus 125 includes data, address and control lines to couple the various functional blocks and host interface 105.

The VGA core 130 couples to the host interface bus 125 and provides compatibility with IBM VGA standards. The VGA core 130 is only enabled during VGA modes. As shown in FIG. 3, the VGA core couples to the memory controller 175 via the memory bus. The CRT controller 120 preferably handles all screen refresh activity and generates monitor timing signals (HSYNC) and VSYNC). The CRT controller 120 also coordinates data fetches from the frame buffer and delivers data to the RAMDAC 110 or screen refresh. The RAMDAC 110 preferably includes color lookup tables and a true color digital-to-analog converter to provide analog signals to monitor 50. The input/output port 140 preferably is used to access the BIOS ROM 85 during initialization. Subsequently, the input/output port 140 functions as a general purpose I/O port. Referring still to FIG. 3, the memory controller 175 orchestrates accesses to the frame buffer 75 over a high bandwidth Rambus interface. The memory controller 75 allocates memory bandwidth among various functional blocks. The graphics engine 150 preferably includes a hardware polygon and line draw engine with 16-bit fractional precision. Thus, the values for rendering parameters have a 16.16 form, with a 16 bit integer value and 16 bit function value.

Figure 4:
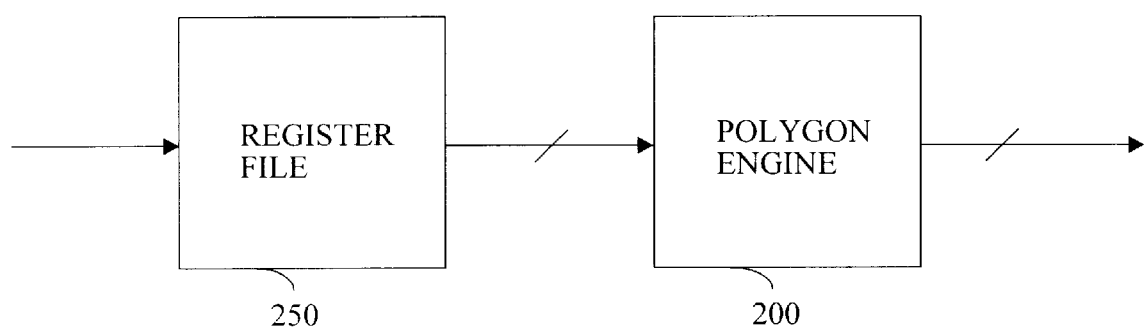
FIG. 4 is a block diagram of the graphics engine of FIG. 3.

The graphics engine 150 is shown generally in FIG. 4, and includes a register file 250 and polygon engine 200. Referring to FIGS. 3 and 4, the polygon engine 200 is capable of rendering random triangles of any orientation, or quadrilaterals with at least one flat top or bottom. The input parameters for the polygon engine are loaded from the system bus 25 into the register file 250. As shown in FIG. 7, and disclosed in more detail below, register file 250 includes values for initial X, Y, Z and red (R) green (G) and blue (B) values. Register file 250 also has main edge slope values for X, Z and top and bottom widths (width 0 and width 1). Ortho slope values for red, green, blue, Z, width 0 and width 1 also are stored in register file 250. In the preferred embodiment, the graphics engine 200 provides texture mapping and both 2D and 3D rendering.

In general, the graphics processor 100 operates in either a coprocessor or processor mode where the CPU 10 or the graphics processor 100, respectively, controls the system bus 25. For graphics operations, the CPU 10 or graphics processor 100 provide data and instructions to the register file 250 for execution. Based upon the vertex points of the polygon to be rendered, the CPU software driver calculates fundamental geometric parameters, including initial and incremental parameters for pixel position, count values, intensity, depth and transparency. These parameters and the corresponding instructions are then loaded into the register file 250. After the initial parameters are loaded in the register file 250, the polygon engine (polyengine) 200 draws orthogonal span lines in the frame buffer 75 to fill in the polygon. The polyengine 200 functions to calculate pixel position, color intensity, depth and transparency or alpha-blending for the purpose of filling multiple-sided, coplanar randomly oriented polygon surfaces. The interpolation process continues until the entire polygon has been filled in and drawn.

To be able to draw any polygon with a single command, certain constraints are followed. In addition to those constraints, two other restrictions about polygons make it possible to draw the polygon without initial width information (WIDTH MAIN or WIDTH OPP). The first restriction is that all triangles to be drawn may not have two vertex points with the same y coordinate at the top of the triangle (i.e., the triangle may not be a flat top triangle). It should be understood, however, that the present invention can draw a flat top triangle if an initial width value (WIDTH MAIN) is specified for the flat top. Second, a triangle that has two vertex points with the same y coordinate at the bottom of the triangle is interpreted as a triangle with only one width slope.

Figure 2:
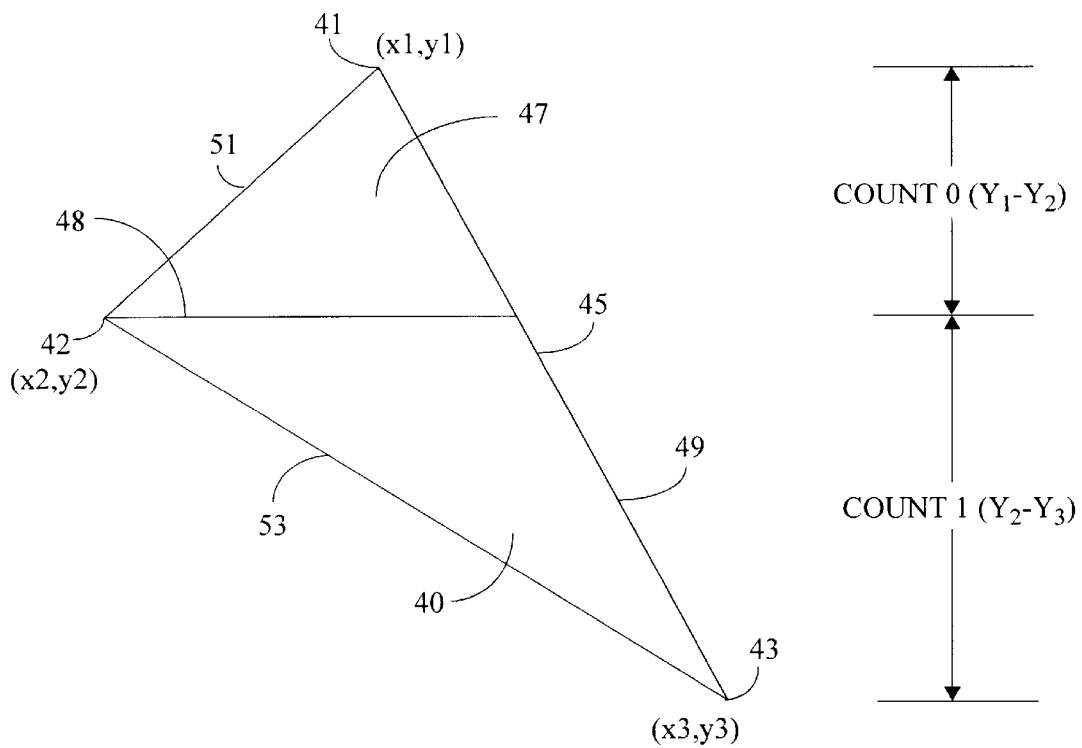
FIG. 2 is a diagram of an exemplary triangle to be rendered by the graphics controller of FIG. 1.

Referring to FIG. 2, the triangle 40 is defined as including a main slope 45 extending the entire vertical length of the triangle 40, a first opposite slope 51, and a second opposite slope 53. Polygon 40 also may include depth values for 3D figures, but such a polygon preferably is mapped to a 2D grid for purposes of drawing it on the display 50. It should also be understood that while the triangle 40 of FIG. 2 has the main slope 45 on the right side, the main slope of any polygon may be either on the right or left side of the polygon, as long as it expands the entire vertical length of the polygon. The graphics processor 100 preferably fills in or shades each polygon beginning at a top vertex of the main slope and draws orthogonal (or horizontal) span lines, each beginning at the main slope and ending a width determined by the width slope value. Although it is preferred that the polygons be drawn from top to bottom, the orthogonal span lines may also be drawn from bottom to top.

Thus, in FIG. 2, the polygon 40 includes a vertex point 41 with coordinates $X_1$, $Y_1$ at the top of the main slope 45, with a width defined as $W_1$. The first orthogonal span tine is drawn right to left from the vertex point 41. Because the triangle 40 is not a flat top triangle, in the present invention the initial width is assumed to be zero. The next orthogonal span line is the next pixel row below the $y_1$ pixel row and this span line is drawn between corresponding points along the main slope 45 and the opposite slope 51. This process continues until an orthogonal line 48 is drawn to a midpoint 42, (which has coordinates $x_2$, $y_2$). Then, successive orthogonal span lines are drawn from the main slope 45 to the opposite slope 53. The procedure is completed when the last orthogonal span line (or point) is drawn at the lower vertex point 43 (with coordinates $x_3$, $y_3$) of the main slope 45. Although the foregoing discussion only relates to drawing a two-dimensional polygon, it should be understood that the present invention can also be used to provide depth, intensity, and alpha parameters.

At the initialization of a graphics cycle to draw a polygon, (such as triangle 40), the software driver receives the parameters $x_1$, $x_2$, $x_3$, $y_1$, $y_2$, $y_3$ and converts these parameters into values defining the top vertex point 41, the number of scan lines (or count) required to draw each half of the polygon, the main slope 45, and width slope values defining the incremental width values between the main slope and the opposite slopes 51, 53.

The top vertex point 41 identifies the initial pixel value to be drawn, and the main slope 45 identifies each subsequent initial pixel to be drawn for each successive orthogonal span line, where the y coordinate or parameter is preferably incremented by one to address the next orthogonal span line. The Count values define the number of times that the y coordinate is incremented for each triangle half. The width slope parameter identifies the number of pixels to be drawn per span line and an x direction bit identifies the direction of the span lines. Because each polygon preferably is drawn using orthogonal scan lines as described above, the slope or incremental values calculated by the software driver are determined for the orthogonal and vertical directions.

The software driver preferably uses floating point or double precision arithmetic to achieve the desired accuracy and provides integer and fractional values for each calculated parameter. Details regarding the manner of implementing the integer and fractional values, and the associated register sets are detailed in commonly-assigned U.S. Pat. No. 5,625,768.

Referring now to FIGS. 2 and 7, the vertical span of the polygon 40 is calculated by the software driver as the difference between the y values at the vertices 41 and 43 or the difference between $y_1$ and $y_3$. In the preferred embodiment, the vertical span is preferably separated into two parts, including a main count value or top half count value (represented as COUNT 0) corresponding to the number of vertical pixels in the first opposite slope 51, and an opposite count value or bottom half count value (represented as COUNT 1) corresponding to the number of vertical pixels in the second opposite slope 53. Thus, the top half count value (COUNT 0) is the vertical span between the y parameter of the midpoint 42 and the top point 41, or $y_1-y_2$. Only the integer portion of COUNT 0 is used and stored in an appropriate location in register file 250 (see FIG. 7). The resulting COUNT 0 value is defined as the Top Count in register file 25 and represents the number of orthogonal span lines between the top vertex 41 and the midpoint 42. Likewise, opposite count values are achieved by the equation $y_2-y_3$ to obtain the COUNT 1 value. The COUNT 1 value defined as the Bottom count in register file 250 and represents the number of orthogonal span lines between the midpoint 42 and the bottom vertex 43. Again, only the integer portion is needed for the COUNT 1 value. In this manner, COUNT 0 orthogonal span lines are drawn from the top vertex 41 to the midpoint 42, and COUNT 1 orthogonal span lines are drawn from the midpoint 42 to the bottom vertex 43. The COUNT 0 and COUNT 1 values are concatenated in register file 250 and stored as the y count value.

The software driver also calculates the main slope value (Δ MAIN), which defines the incremental changes in the x parameter along the main slope 45. Similar main slope values also can be calculated for other parameters such as depth, intensity and alpha. The main slope value preferably is calculated using the equation $(x_1-x_3)/(y_1-y_3)$. Note that this will be a negative value for the triangle 40 since x is decreasing. Because the vertical component y comprises the main stepping or count value for the orthogonal span lines, the incremental y value is chosen to have a value of 1 or −1 (depending upon whether the polygon is rendered from top to bottom or bottom to top), so that the next orthogonal span line is accessed for each count of y.

The software driver also calculates incremental width values (or width slopes) for both the upper or top portion 47 of the triangle 40, and the lower or bottom portion 49 of triangle 40. In the preferred embodiment, an initial width value of zero is assumed for the first scan line, although a different initial width can be calculated and loaded into the register file 250 as a WIDTH MAIN (or $W_1$) value to signify the initial width of a flat top polygon. The graphics processor 100 uses the assumed initial width value (WIDTH MAIN) and the calculated incremental width value in order to determine the length of each of the orthogonal span lines to be drawn. By assuming a constant value for the WIDTH MAIN at the first scan line, it becomes unnecessary to load and calculate an initial width, thus saving register space and processor time.

The width slope (Δ WIDTH) preferably is defined as the change in width for each increment of y. A width slope is defined for both the top and bottom portions of triangle 40 as Δ WIDTH MAIN and Δ WIDTH OPP, respectively. These width slope values are used to define the length of each orthogonal scan line. Thus, the initial width (presumably zero) is incremented by the width slope value to obtain the width for the second orthogonal scan line. Selection of the proper width slope value (MAIN or OPP) is determined by a state machine in the polygon engine 200, as will be described below with reference to FIG. 5. This process continues until the top half 47 of triangle 40 is drawn. According to the preferred embodiment, the final width value from the first half 47 of triangle 40 preferably is retained and used as the initial width value for the second half 49 of triangle 40. The width of each successive scan line is defined by the width slope calculated for the second half 49 of triangle 40. As a result, no value is required for the WIDTH OPP parameter in register file 250, thus eliminating the need for that register.

As one skilled in the art will understand, slope values typically include a sign bit indicating the direction of change. With respect to the width slope values, fractional values preferably are only used in the calculations for accuracy, with only the integer portion used to determine the actual number of pixels drawn. Also, the software driver determines an x direction bit for defining the direction in which each scan line is drawn. For the triangle 40, scan lines are written from the main slope 45 at the right towards the opposite slopes 51, 53 for a negative x direction for the polygon 40. Interpolation preferably proceeds from the top point 41 to the midpoint 42 to draw the upper or top portion 47 of the triangle 40. At that time, interpolation proceeds for the bottom portion 49 of triangle 46.

Figure 5:
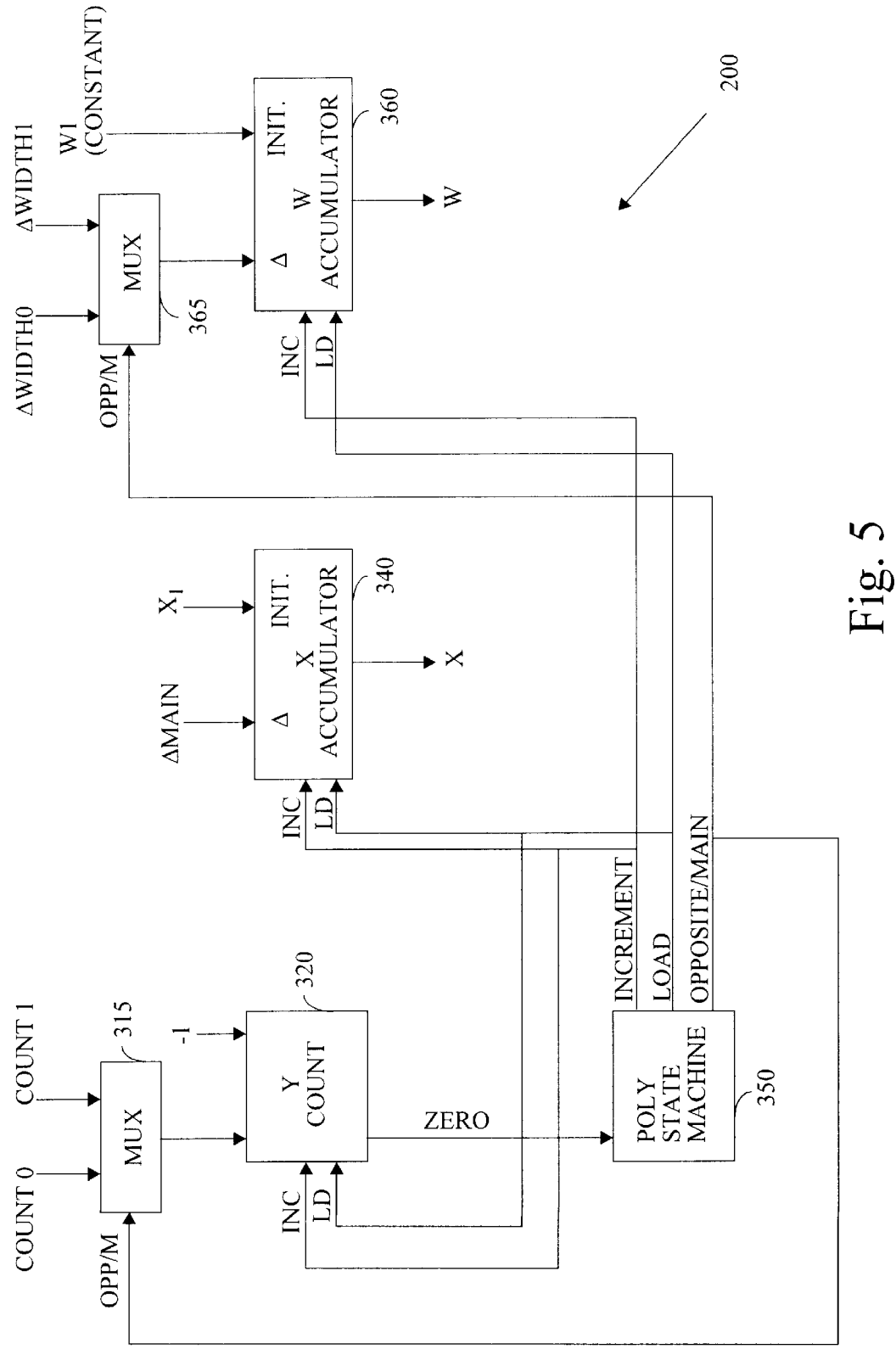
FIG. 5 is a schematic diagram illustrating a portion of the polygon engine of FIG. 4.

Referring now to FIGS. 5 and 7, the polygon engine 200 preferably comprises a Y counter 320, an X accumulator 340, a width accumulator 360, and a polygon state machine 350. Similar accumulators may be provided for other parameters if desired. The polygon state machine 350 preferably provides increment (INC), load (LD) and opposite/main (OPP/M) signals to the Y counter 320, X accumulator 340, and width accumulator 360. The increment (INC) signal causes the counter 320 to count, and causes the accumulators 340, 360 to perform calculations. In particular, the increment (INC) signal causes accumulators 340, 360 to generate starting X and width values, respectively, for each successive span line. The load (LD) signal causes the counter 320, and accumulators 340, 360 to load certain initial parameters. The opposite/main (OPP/M). signal functions to select input parameters for loading, based upon whether the top (main) or bottom (OPP) section of the polygon is being rendered.

The polygon state machine 350 preferably receives an output signal from Y counter 320 indicating when the y count equals zero, thus indicating that a section of the polygon has been rendered. The Y counter 372 has an associated multiplexer 315, that selects either the Count 0 or Count 1 value as the count value for counter 320. Selection of the count by multiplexer 315 is determined by the status of the OPP/M output from polygon state machine 350. If the opposite status is indicated, the Count 1 value is provided as an initial value to counter 320, and if the main status is indicated, the Count 1 value is provided to counter 320. The count value selected by multiplexer 315 is loaded into counter 320 when the LD signal is asserted by state machine 350. As a second data input, the Y counter 320 receives a constant value input indicating the direction to count (which determines whether the polygon is drawn from top to bottom or bottom to top). A negative value (−1) indicates the counter counts down. After a count value is loaded in counter 320, the INC signal causes counter 320 to count one integer value towards 0. When the count in counter 320 equals 0, an output signal is provided to state machine 350.

Referring still to FIGS. 5 and 7, the X accumulator 340 receives as inputs an initial x value (X) and a main slope value (Δ MAIN). The $X_1$ value and main slope (Δ MAIN) value are loaded when the load (LD) signal is asserted by state machine 350. The X accumulator 340 receives an increment (INC) signal and in response calculates the starting X coordinate for the next span line. This calculation is done by adding the Δ MAIN value to the accumulated value in the X accumulator 340.

Referring still to FIGS. 5 and 7, the width accumulator 360 has an associated multiplexer 365 for selecting the appropriate width slope value Δ WIDTH MAIN (Δ WIDTH 0) or Δ WIDTH OPP (Δ WIDTH 1) as an input to accumulator 360. The multiplexer 365 selects the Δ WIDTH MAIN (Δ WIDTH 0) value when the state machine 350 enables the main status of the opposite/main output line. Conversely, the Δ WIDTH OPP (Δ WIDTH 1) is selected when the OPPOSITE/MAIN status is asserted on the OPPOSITE/MAIN line.

The width accumulator 360 loads the selected width slope and, in certain circumstances, the initial width value (WIDTH MAIN). According to the preferred embodiment, the WIDTH MAIN is assumed to be a constant value, such as zero. If a value other than zero is provided, a flat top triangle is indicated. In response to increment signals, the width accumulator 360 adds the selected width slope value to the accumulated width value and provides an output signal indicating the width of the scan line.

Figure 6:
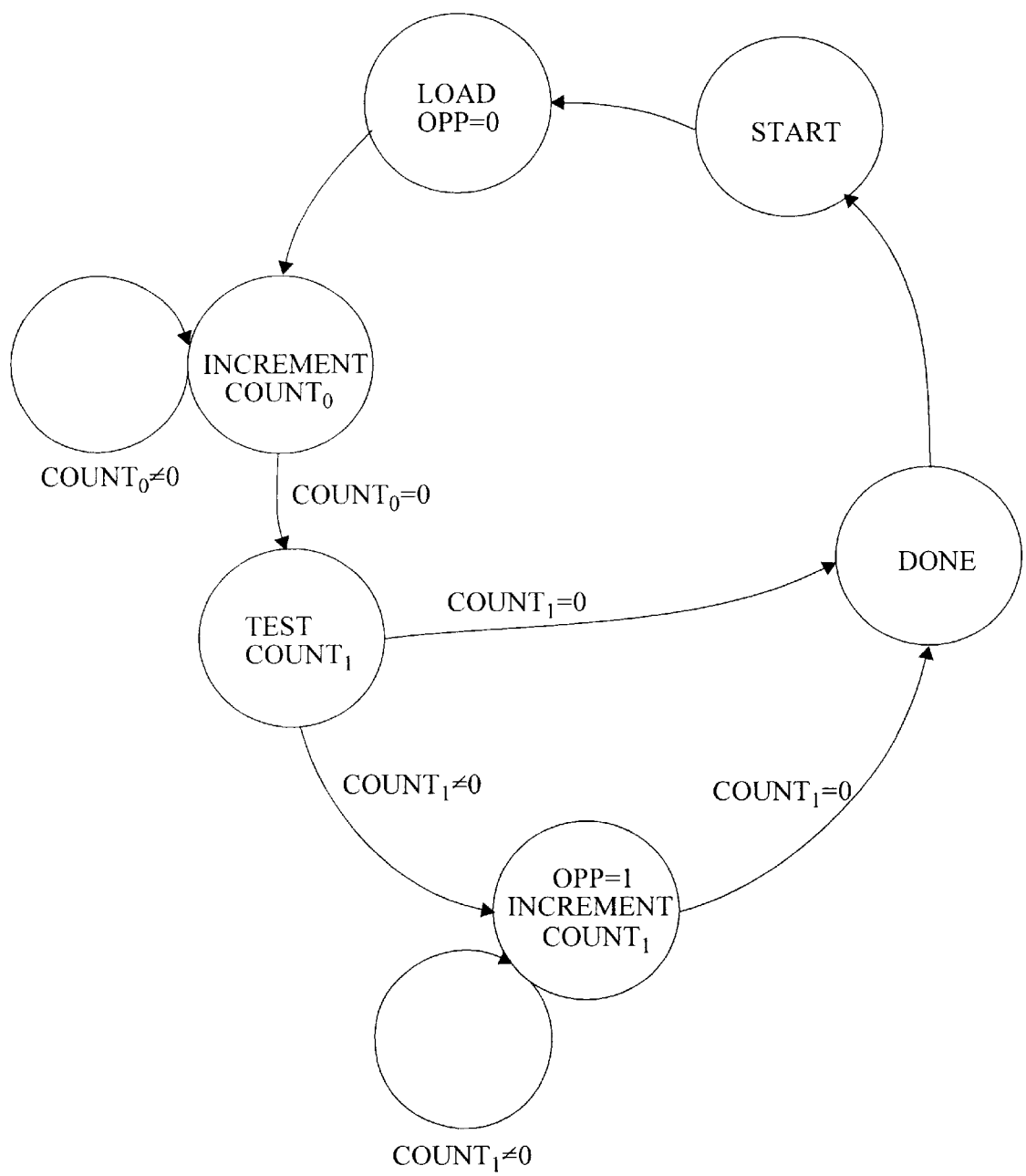
FIG. 6 illustrates the operation of the polygon state machine of FIG. 5.

Referring now to FIGS. 5 and 6, the operation of the polygon state machine 350 will now be described. The polygon state machine 350 initiates a polygon rendering operation by asserting the LD signal and the MAIN signal (OPP/M=0). In response, initial main values (count 0 and Δ WIDTH 0) are selected by multiplexers 315, 365 and loaded into counter 370 and accumulators 340, 360 together with initial values ($X_1$ and Δ MAIN).

Increment signals then are generated by state machine 350, causing COUNT 0 to count to zero. On each increment, an X value and a width value are generated by accumulators 340, 360 for each scan line in the top portion of the polygon. When COUNT 0 reaches zero, the COUNT 1 value is tested. If the COUNT 1 value is zero, a flat bottom polygon is indicated and further operation is terminated.

If the COUNT 1 value is not zero, the OPPOSITE status is asserted (OPP/M=1) and the opposite values (COUNT 1 and Δ WIDTH 1) are selected and loaded into counter 320 and accumulator 360. The current width value in accumulator 360 is kept, however, and used as the initial width value for the bottom portion of the polygon. The COUNT 1 value is then incremented, with X and width values provided for each scan line for each increment. When COUNT 1 reaches zero, operation is terminated.

Numerous variations and modifications will become apparent to those skilled in the art once the above disclosure is fully appreciated. It is intended that the following claims be interpreted to embrace all such variations and modifications.

We claim:

1. A graphics processor that receives parameters defining a polygon from a host processor and rendering said polygon by successive orthogonal scan lines, said parameters capable of defining a polygon as one or more adjacent sections, said graphics processor comprising:
    a register file for storing said parameters;
    a polygon engine including a first accumulator for determining a starting X coordinate for each orthogonal scan line, a second accumulator for determining a width for each scan line, and a counter defining the number of scan lines;
    a polygon state machine for loading and selecting initial values for said accumulators and said counter and for incrementing said accumulators and said counter; and
    if said parameters define a polygon as first and second adjacent sections, then the contents of said second accumulator are used as an initial width for the second section.

2. A graphics processor as in claim 1, further comprising a first multiplexer associated with said counter for selecting a first count or a second count.

3. A graphics processor as in claim 2, further comprising a second multiplexer associated with said second accumulator for selecting a first width slope or a second width slope.

4. A graphics processor that receives parameters defining a polygon from a host processor and rendering said polygon by successive orthogonal scan lines, comprising:
    a register file for storing said parameters;
    a polygon engine including a first accumulator for determining a starting X coordinate for each orthogonal scan line, a second accumulator for determining a width for each scan line, a counter defining the number of scan lines;
    a polygon state machine for loading and selecting initial values for said accumulators and said counter and for incrementing said accumulators and said counter; and
    wherein said polygon state machine provides a select control signal to said first and second multiplexer.

5. A graphics processor as in claim 4, wherein said first accumulator is loaded with a width slope value and an initial x value.

6. A graphics processor as in claim 4, wherein said second accumulator assumes a first width value for said first width slope.

7. A graphics processor as in claim 6, wherein said second accumulator uses a current accumulated value as an initial width for said second width slope when said second width slope is selected by said second multiplexer.

8. A graphics processor as in claim 7, wherein said processor includes
    a host bus;
    a host interface unit coupling said host interface bus to a system bus;
    a polygon engine coupled to said host interface bus;
    a RAM bus coupled to said polygon engine; and
    a memory controller coupled to said RAM bus for controlling accesses to a frame buffer.

9. A graphics processor as in claim 8, wherein said host interface unit is capable of asserting mastership of said system bus.

10. A method of rendering a polygon in a pixel grid, comprising:
    splitting the polygon into sections;
    defining initial parameters for said polygon, including:
        a main slope value, an initial X value, the number of vertical scan lines for each polygon section, and a width slope value for each polygon section;
    selecting and loading a first count value into a counter;
    selecting and loading a first width slope value into a width accumulator;
    loading a main slope value and an initial X value into an X accumulator;
    providing increment signals to said counter to count the number of scan lines in a first section of the polygon;
    incrementing the X accumulator to provide a starting X coordinate for each scan line;
    incrementing the width accumulator to provide a width value for each scan line;
    determining when the first count value equals zero, and in response, selecting and loading second count value into said counter and selecting and loading a second width slope value into said width accumulator and maintaining the width value in said width accumulator.

11. A computer system, comprising
    a system bus;
    a central processing unit coupled to said system bus and which is capable of defining a polygon as multiple polygon sections;
    a display unit including a grid of pixels;
    a graphics controller directly connected to said system bus and also coupled to said display unit for rendering polygons in the grid of pixels; and
    a frame buffer coupled to said graphic controller;
    wherein said graphics controller includes:
        a register file receiving parameters from the central processing unit to define a polygon to be drawn in said grid of pixels;
        a polygon engine with a counter and a first and second accumulator, said counter indicating the number of scan lines to be drawn for a polygon, and the accumulators computing the starting point and width of each scan line; and wherein if said polygon is divided into first and second sections by said central processing unit, then the contents of said second accumulator are used as the initial width for the second section.

12. A system as in claim 11 wherein said polygon engine uses a predetermined orthogonal width to render said first section.

13. A system as in claim 12, wherein said computer system includes a system memory coupled to said system bus, said graphics controller is capable of reading said polygon parameters from system memory into said register file, and wherein said predetermined initial orthogonal width is zero.

14. A system as in claim 11, wherein said polygon engine uses a predetermined initial orthogonal width to render said first section.

15. A system as in claim 14, wherein said predetermined initial orthogonal width is zero.

16. A system as in claim 11, wherein said polygon is divided into two sections by said central processing unit, said counter counts the number of scan lines for each polygon section, and wherein said polygon engine draws said first section beginning with a predetermined initial orthogonal width.

17. A system as in claim 16, wherein one of two count values are selectively provided as an initial value to said counter based upon the section of the polygon being rendered, and wherein said predetermined initial orthogonal width is zero.

18. A system as in claim 17, wherein said polygon engine includes a multiplexer associated with said counter for selecting the count value provided to said counter.

19. A system as in claim 16, wherein a main slope value is stored in said register file.

20. A system as in claim 19, wherein the main slope value is provided as an input into said first accumulators together with an initial X value, and said first accumulator determines a starting X coordinate for each successive scan line.

21. A system as in claim 11, wherein a first and second width slope are selectively provided as an input to said second accumulator, and said second accumulator determines a width for each scan line by using a predetermined initial width value for said first polygon section.

22. A system as in claim 21, wherein said predetermined initial width value is zero.

23. A computer system, comprising
a system bus;
a central processing unit coupled to said system bus;
a display unit including a grid of pixels;
a graphics controller directly connected to said system bus and also coupled to said display unit for rendering polygons in the grid of pixels; and
a frame buffer coupled to said graphic controller;
wherein said graphics controller includes:
a register file receiving parameters from the central processing unit to define a polygon to be drawn in said grid of pixels;
a polygon engine with a counter and a first and second accumulator, said counter indicating the number of scan lines to be drawn for a polygon and the accumulators computing the starting point and width of each scan line; and
wherein:
said graphics controller has system bus master capabilities;
said computer system includes a system memory coupled to said system bus, and said graphics controller is capable of reading said polygon parameters from system memory into said register file;
said graphics controller comprises an integrated graphics processor which includes a host interface unit and RAMDAC;
said integrated graphics processor includes a memory controller;
said polygon is divided into two sections by said central processing unit, and said counter counts the number of scan lines for each polygon section;
one of two count values are selectively provided as an initial value to said counter based upon the section of the polygon being rendered;
said polygon engine includes a multiplexer associated with said counter for selecting the count value provided to said counter; and
said polygon engine includes a state machine for providing an output signal to said multiplexer indicative of the section of the polygon being rendered.

* * * * *